(12) United States Patent
Jensen et al.

(10) Patent No.: US 12,381,861 B2
(45) Date of Patent: Aug. 5, 2025

(54) SYSTEM AND METHOD FOR A SECURE UNIDIRECTIONAL NETWORK INTERFACE

(71) Applicant: Rosemount Aerospace Inc., Burnsville, MN (US)

(72) Inventors: Issac A. Jensen, Eagan, MN (US); Kraig S. Lund, Lakeville, MN (US); Timothy J. Woods, Burnsville, MN (US); Jeremy M. Franklin, Savage, MN (US); Douglas Eucken, Lakeville, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 284 days.

(21) Appl. No.: 18/152,658

(22) Filed: Jan. 10, 2023

(65) Prior Publication Data
US 2024/0236057 A1 Jul. 11, 2024

(51) Int. Cl.
*H04L 9/40* (2022.01)

(52) U.S. Cl.
CPC ........ *H04L 63/0485* (2013.01); *H04L 63/205* (2013.01)

(58) Field of Classification Search
CPC .............. H04L 63/0485; H04L 63/205; H04L 63/0281; H04L 63/164; H04L 63/20; H04L 63/0209; H04L 9/40
See application file for complete search history.

(56) References Cited

U.S. PATENT DOCUMENTS

| | | | |
|---|---|---|---|
| 8,069,250 B2 | 11/2011 | Panjwani et al. | |
| 8,498,206 B2 | 7/2013 | Mraz | |
| 8,566,922 B2 | 10/2013 | Hargis | |
| 9,237,126 B2 | 1/2016 | McEvoy | |
| 9,590,964 B1 | 3/2017 | Bortz et al. | |
| 9,973,532 B2 | 5/2018 | Harrison | |
| 10,990,737 B2 | 4/2021 | Staubly et al. | |
| 11,063,886 B2 | 7/2021 | Shani et al. | |
| 11,323,288 B2 | 5/2022 | Ngo et al. | |
| 12,003,524 B2* | 6/2024 | Berger | H04L 63/20 |

(Continued)

OTHER PUBLICATIONS

Extended European Search Report for European Patent Application No. 24151200.3, Jun. 5, 2024, 6 Pages.

*Primary Examiner* — Quazi Farooqui
(74) *Attorney, Agent, or Firm* — Kinney & Lange, P.A.

(57) ABSTRACT

A secure network interface system includes a secure domain interface, a processing system, a network function device, and a network interface. The processing system is configured to send and receive information within secure systems, transmit configuration data for the network interface, compile data from the secure systems into a plurality of data packets, and transmit the plurality of data packets to the network function device without being physically capable of receiving data packets from the network function device, thus providing a demonstration of security partitioning. The network function device receives the configuration data, configures the network interface using the configuration data, and provides discrete feedback to the processing system regarding a configuration status. The network interface sends the plurality of data packets to one or more external unsecure systems and to limits a communication protocol type received from one or more external unsecure systems.

20 Claims, 4 Drawing Sheets

(56) References Cited

U.S. PATENT DOCUMENTS

| | | | |
|---|---|---|---|
| 2020/0410833 A1* | 12/2020 | Grothoff | H04L 12/2809 |
| 2021/0067488 A1 | 3/2021 | Gremaud et al. | |
| 2022/0224673 A1 | 7/2022 | Shimony et al. | |
| 2023/0412601 A1* | 12/2023 | Gourlay | H04L 63/20 |
| 2024/0356972 A1* | 10/2024 | Matzen | H04L 63/1491 |

* cited by examiner

SYSTEM AND METHOD FOR A SECURE UNIDIRECTIONAL NETWORK INTERFACE

BACKGROUND

Systems required to communicate with each other may reside in a secure network domain. The need, however, to communicate with systems outside the secure network domain may arise. This can give rise to the potential of a security breach based upon the data received from an unsecure system into the secure network domain. A typical solution may be a software-based firewall or to accept no data at all from an unsecure system. A software-based firewall is a case of software protecting more vulnerable software, making it difficult to prove the security of the system and resulting in vulnerabilities that may still be exploited. Accepting no data at all prevents a secure system from receiving basic features of communication, such as a confirmation of receipt of data from the unsecure system. Thus, a system for secure communication from outside of the secure network domain is desirable.

SUMMARY

A secure network interface system includes a secure network domain and an unsecure network domain. The secure network domain includes one or more secure systems, a secure domain interface, and a processing system operably connected to the secure domain interface. The unsecure network domain includes a network function device operably connected to the processing system, and a network interface operably connected to the network function device. The processing system is configured to send and receive information with one or more secure systems residing in a secure domain through the secure domain interface, to program the network function device with a device firmware, to transmit a set of configuration data for the network interface, to aggregate data from the one or more secure systems by compiling the information into a plurality of data packets, and to transmit the plurality of data packets to the network function device. The network function device is configured to receive the set of configuration data for the network interface from the processing system, to configure the network interface using the set of configuration data for the network interface, and to provide discrete feedback to the processing system regarding a configuration status of the network function device and the network interface. The network interface is configured to send the plurality of data packets to one or more external unsecure systems and to receive one or more permitted communication protocol types from one or more external unsecure systems.

A secure network interface system includes a secure network domain and an unsecure network domain. The secure network domain includes one or more secure systems, a secure domain interface, and a processing system operably connected to the secure domain interface. The unsecure network domain includes a network function device operably connected to the processing system. The processing system is configured to send and receive information with one or more secure systems residing in a secure domain through the secure domain interface, to program a network function device with a device firmware, and to aggregate data from the one or more secure systems by compiling the information into a plurality of data packets. The network function device is configured to provide discrete feedback to the processing system regarding a configuration status of the network function device, to send the plurality of data packets to one or more external unsecure systems, and to receive one or more permitted communication protocol types from one or more external unsecure systems.

A method for secure network communication via a system having a secure domain interface, a processing system, a network function device, and a network interface includes transmitting information from the processing system to one or more secure systems residing in a secure domain through the secure domain interface. The method further includes aggregating data from the one or more secure systems by compiling the information into a plurality of data packets via the processing system and transmitting the plurality of data packets to the network function device from the processing system. The method further includes transmitting a set of configuration data for the network interface from the processing system to the network function device and configuring the network interface using the set of configuration data for the network interface via the network function device. The method further includes transmitting discrete feedback to the processing system from the network function device regarding a configuration status of the network interface, transmitting the plurality of data packets to one or more external unsecure systems from the network interface, and receiving one or more permitted communication protocol types from the one or more external unsecure systems via the network interface.

DETAILED DESCRIPTION

According to the techniques of this disclosure, a system for secure network communication can be used to provide secure communication between a secure system and an unsecure system. The system can do so by using a dedicated hardware device to perform network interaction between the processing function of a secure system and a network interface. In doing so, the dedicated hardware device allows for transmission of data from the secure system to the unsecure system, without allowing the unsecure system to send information back to the secure system outside of discrete pre-defined status symbols. Thus, the techniques of this disclosure can allow for communication between a secure system and an unsecure system without compromising the security of the secure system.

Figure 1:
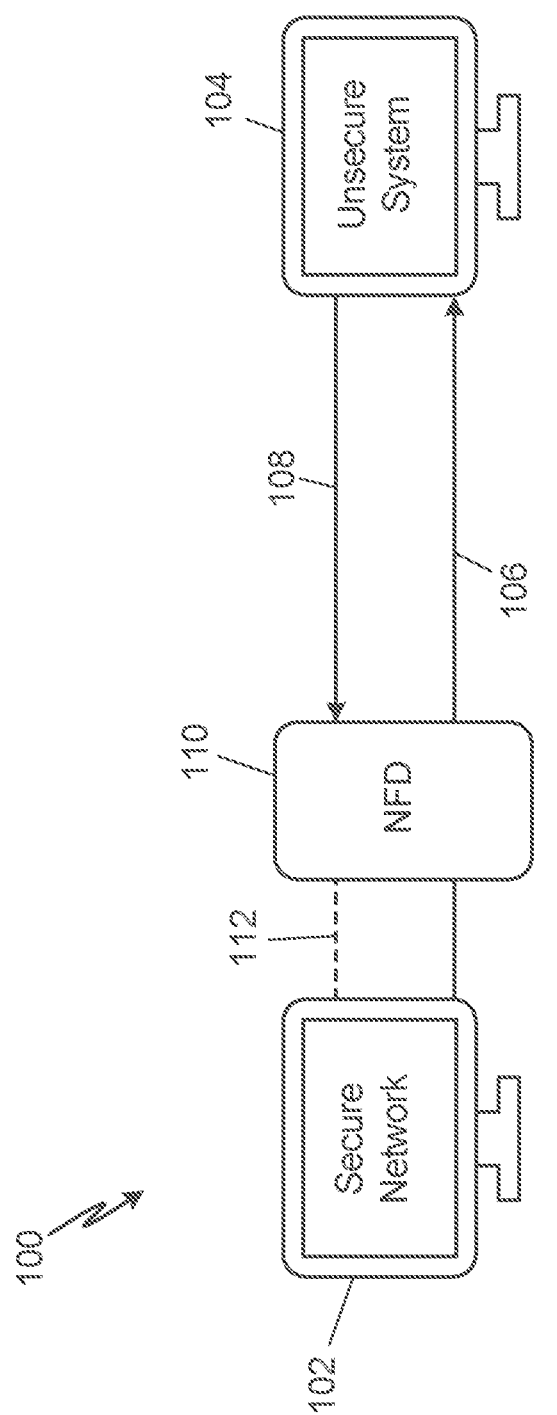
FIG. 1 is a diagram of a network environment.

FIG. 1 is a diagram of network environment 100. Network environment 100 includes secure network domain 102, external unsecure system 104, secure-to-unsecure communication path 106, unsecure-to-secure communication path 108, network function device 110, and discrete signal path 112.

Secure network domain 102 and external unsecure system 104 can include general computing devices capable of sending and/or receiving data. Secure network domain 102 and/or external unsecure system 104, for example, may contain one or more computers or interconnected computing devices. Such computers or interconnected computing devices may be configured to exchange data and share resources with each other. The one or more computers or interconnected computing devices can be configured to communicate within secure network domain 102 and/or external unsecure system 104 via communication protocols. Such communication protocols can be transmitted using physical electrical connections and/or wireless communication. Devices within secure network domain 102 and/or external unsecure system 104 can be organized in various architectures, including but not limited to a client-server architecture or a peer-to-peer architecture. Secure network domain 102 and/or external unsecure system 104 can also be of various sizes such as local area networks (LAN), wide area networks (WAN), or any other network size.

Secure network domain 102 and external unsecure system 104 are connected via secure-to-unsecure communication path 106, through network function device 110. Secure network domain 102 is also connected to network function device 110 by unsecure-to-secure communication path 108. Network function device is connected to secure network domain 102 by discrete signal path 112.

Secure-to-unsecure communication path 106 allows for the transfer of data from secure network domain 102 to external unsecure system 104, wherein the data passes through network function device 110. The data transferred via secure-to-unsecure communication path 106 can be transferred in data packets, wherein the data is aggregated into one or more packets within secure network domain 102 and sent through network function device, to external unsecure system 104 via secure-to-unsecure communication path 106. The one or more data packets sent using secure-to-unsecure communication path 106 can be sent using various communication protocols. In some embodiments, the data may be transmitted in User Datagram Protocol (UDP) packets. Such packets may contain data including but not limited to video, audio, or text data that is aggregated within secure network domain 102. Other communication protocols for transmission of such data may also be used. In other embodiments, the one or more data packets can alternatively be transmitted in Address Resolution Protocol (ARP) and/or internet control message protocol (ICMP). ARP and ICMP packets may be used for basic internet protocol functionality such as mapping internet protocol (IP) addresses or error reporting due to errors in transmitting or receiving data.

Unsecure-to-secure communication path 108 allows for a limited transfer of data from external unsecure system 104 to network function device 110 via unsecure-to-secure communication path 108. In some embodiments, the communication protocols for communication along unsecure-to-secure communication path 108 are limited to ARP and ICMP packets. In such an embodiment, only information about basic internet protocol functionality can be sent along unsecure-to-secure communication path 108. In such an embodiment, no other data can be received by network function device 110. In other embodiments, other communication protocols that transmit information about basic internet protocol functionality (such as address resolution or error reporting) may be used to transmit information along unsecure-to-secure communication path 108.

The data transfer occurring via discrete signal path 112 transmits data from network function device 110 to secure network domain 102. The data transfer along discrete signal path 112 can be limited to signals that are discrete logic signals. That is, the discrete logic signals are limited to a fixed number of logic 0's or logic 1's which can provide statuses on pre-defined functions.

Network function device 110 represents a separation point between secure network domain 102 and external unsecure system 104. Network function device 110 is only able to transfer discrete logic signals to secure network domain 102. Thus, in the case of a security breach wherein external unsecure system 104 may send unwanted signals back to network function device 110 along unsecure-to-secure communication path 108, network function device 110 is unable to transmit those signals to secure network domain 102.

Network environment 100 provides the advantage of maintaining security within a secure system when the secure system is required to communicate with an unsecure system. Such protection is afforded by the fact that network function device 110 is a hardware implementation which can only send discrete signals back to secure network domain 102 via discrete signal path 112. Thus, no other potentially unsecure signals can be passed from unsecure system 104 to secure network domain 102. Such a configuration can be compatible with various communication protocols and is highly reusable as it works with a standard ethernet network interface.

Figure 2:
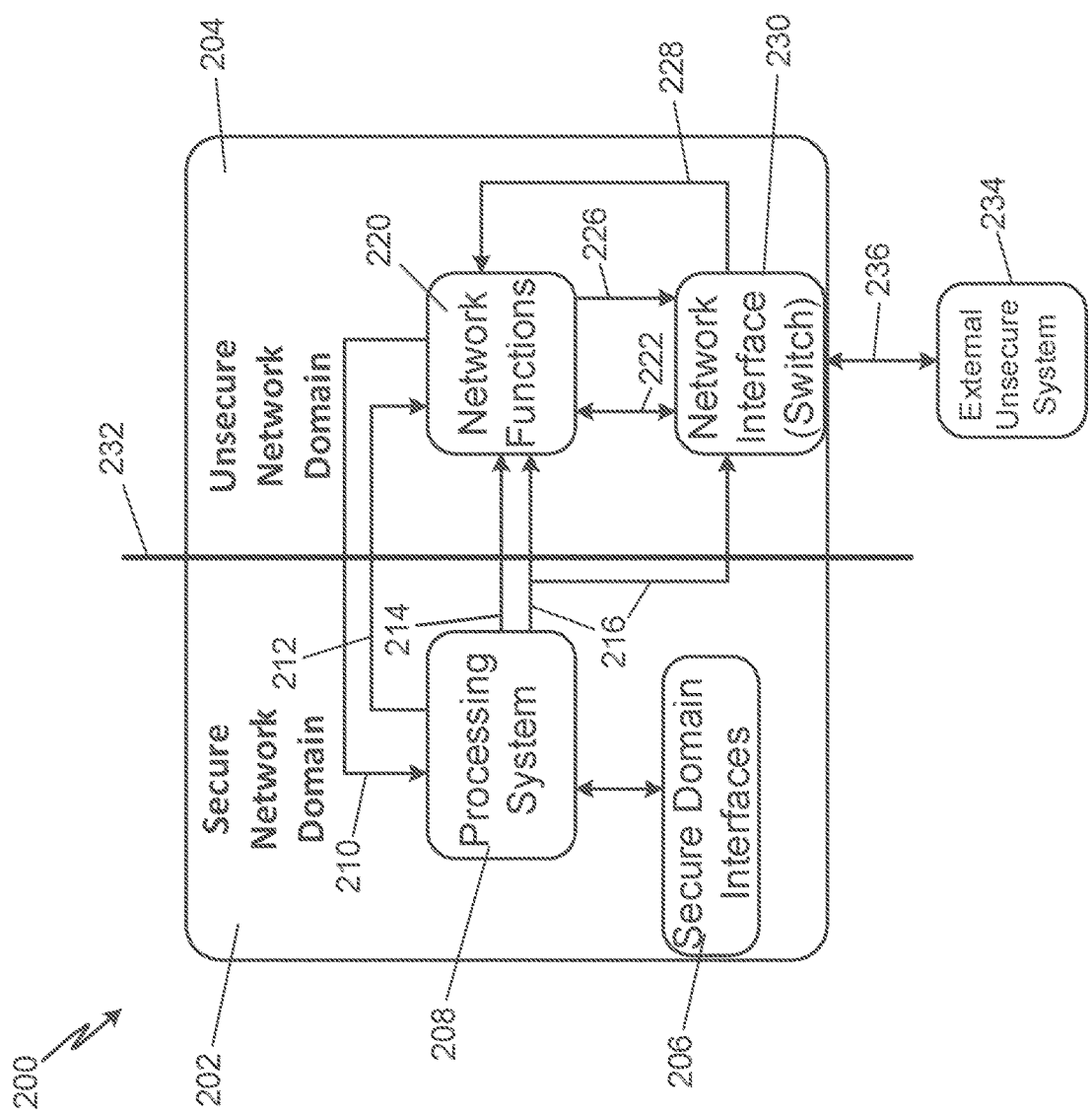
FIG. 2 is a diagram of a network environment including a secure network interface and unsecure network interface.

FIG. 2 is a diagram of network environment 200. Network environment 200 includes secure network domain 202 and unsecure network domain 204. Network environment 200 also involves external unsecure system 234 and ethernet connection 236 as depicted in FIG. 2. FIG. 2 is consistent with the implementation depicted in FIG. 1. Secure network domain 202 is consistent with secure network domain 102 of FIG. 1. Unsecure network domain 204 is depicted by network function device 110 of FIG. 1, wherein network function device 110 may or may not also include a network interface, as described in the embodiments of FIG. 2 and FIG. 3. External unsecure system 104 is consistent with external unsecure system 234 of FIG. 2.

Secure network domain 202 includes secure domain interfaces 206, processing system 208, discrete return connection 210, field-loading connection 212, ethernet connection 214, and discrete transmission connection 216. Unsecure network domain 204 includes network function device 220, ethernet connection 222, configuration connection 226, discrete return connection 228, and network interface 230. Secure threshold 232 delineates the separation between secure network domain 202 and unsecure network domain 204. External unsecure system 234 and ethernet connection 236 are external to secure network interface system 200.

Within secure network domain 202, secure domain interfaces 206 are operably connected to processing system 208. Processing system 208 is configured to send data across secure threshold 232 to both network function device 220 and network interface 230. Processing system 208 is operably connected to network function device 220 via discrete return connection 210, field-loading connection 212, ethernet connection 214, and discrete transmission connection 216. Processing system 208 is also operably connected to network interface 230 via discrete transmission connection 216.

Network function device 220 is operably connected to network interface 230 within unsecure network domain 204. Network function device 220 is operably connected to network interface 230 via ethernet connection 222, configuration connection 226, and discrete return connection 228. Network interface 230 is operably connected to external unsecure system 234 via ethernet connection 236.

In operation, secure domain interfaces 206 provide a means for processing system 208 to send and receive information freely with other systems residing within secure network domain 202. In some embodiments, there can be one, two, or more than two systems residing in secure network domain 202. As described in FIG. 1, secure network domain 202 can include general computing systems capable of sending and/or receiving data. Further, as described in FIG. 1, the systems within secure network domain can be organized into various architectures and can be of various sizes.

Processing system 208 is configured to send firmware to network function devices 220 using field-loading connection 212. The firmware may contain configuration instructions for the network function device 220. In some embodiments, the network function device is a Field Programmable Gate Array (FPGA). In such an embodiment, the FPGA is programmed by the firmware received from processing system 208 via field-loading connection 212. Processing system 208 is also configured to send configuration data for network interface 230 via field-loading connection 212. Field-loading connection 212 can be a unidirectional interface configured to send firmware and configuration data, without receiving return data from network function device 220, network interface 230, or any external system. The configuration data for network interface 230 is stored within network function device 220, before being passed on to network interface via configuration connection 226.

Processing system 208 is further configured to be able to pass discrete signals from processing system 208 to network function device 220 via discrete transmission connection 216. The discrete signals sent from processing system 208 to network function device 220 can accomplish functions such as resetting network function device 220 or disabling network function device 220. Similarly, processing system 208 is configured to be able to pass discrete signals from processing system 208 to network interface 230 via discrete transmission connection 216 to accomplish functions such as resetting network interface 230 or disabling network interface 230.

Processing system 208 may also receive discrete information back from network function device 220 and network interface 230. This information can be indicative of a device status. In an example embodiment, network function device 220 may return a discrete signal of bits signaling that network function device 220 is functioning correctly, that network function device 220 is undergoing a reset, and/or that network function device 220 is disabled. Processing system 208 may receive such information via discrete return connection 210. Additionally, processing system 208 may receive information about a device status with respect to network interface 230. In one embodiment, network interface 230 may send discrete signals indicative of a device status of network interface 230 to network function device 220 via discrete return connection 228. Network function device 220 can store the discrete signals indicative of the device state of network interface 230, then transmit such discrete signals back to processing system 208 via discrete return connection 210. Thus, processing system 208 can receive discrete signals indicative of the status of both network function device 220 and network interface 230.

Discrete signals received along discrete return connection are limited to pre-defined logic signals. Thus, a returned signal along discrete return connection 210 can be limited to logic 0's and logic 1's, wherein the signal is indicative of a pre-defined function. Information that may be conveyed based on pre-defined functions includes but is not limited to a network function device 220 configuration status, a network interface 230 configuration status, a connectivity status between network function device 220 and network interface 230, and a connectivity status between network interface 230 and external unsecure system 234. For example, processing system 208 may receive a return signal along discrete return connection 210 indicating that network function device 220 and network interface 230 are configured correctly, and that connectivity with external unsecure system 234 has been established with network interface 230. Such a signal would be indicated by a pre-defined string of discrete logic 0's and logic 1's. Thus, processing system 208 can be configured to only receive signals that coincide with the pre-defined functions.

Processing system 208 can also aggregate data to be shared with external unsecure system 234. In some embodiments, processing system 208 does not directly send the data to external unsecure system 234. Rather, processing system 208 aggregates and packetizes the data to be shared, and transmits the data to network function device 220 via ethernet connection 214. Network function device 220 transmits the packetized data to network interface 230 via ethernet connection 222, and network interface transmits the packetized data to external unsecure system 234 via ethernet connection 236. Data that is to be sent from processing system 208 to network function device 220 via ethernet connection 214 may be packetized in User Datagram Protocol (UDP) packets. UDP packets may contain data including but not limited to video, audio, and/or text data that is aggregated within secure network domain 202. The UDP packets from processing system 208 can be passed via a unidirectional MAC-to-MAC connection to network function device 220. In some embodiments, there may be no physical return path on the MAC-to-MAC connection from the network function device 220 to processing system 208 of the secure system. Other communication protocols for transmission of data such as video, audio, and/or text may also be used in a similar configuration.

Network function device 220 is configured to receive a bitstream from processing system 208 via field-loading connection 212. As described, the bitstream received from processing system 208 can contain firmware to be downloaded within network function device 220 and configuration information for network interface 230. Network function device 220 executes the field-upgradable operational firmware to configure network interface 230 to the external unsecure system 234, to handle the basic internet protocol messaging, to relay information sent from the processing system 208 to the network interface 230, and to provide only discrete pre-defined status signals back to processing system 208. The discrete feedback transmitted via discrete return connection 210 can indicate that network function device 220 was configured correctly or incorrectly by the bitstream sent by processing system 208. Further, network interface 230 can transmit discrete feedback to network function device 220 via discrete return connection 228. The discrete feedback transmitted via discrete return connection 228 can indicate that network interface 230 was configured correctly or incorrectly. Network function device 220 can then relay the discrete feedback regarding the correct or incorrect configuration of network interface 230 to processing system 208 via discrete return connection 210.

Network function device 220 is further configured to receive the packetized data from processing system 208. After receiving the packetized data, network function device 220 can send the packetized data to network interface 230. In some embodiments, network function device 220 will only send the packetized data to network interface 230 if network interface 230 has been configured correctly and/or if network function device 220 has been configured correctly.

Network interface 230 receives data from various components within secure network interface system 200. Network interface 230 is configured to receive the configuration signal from network function device 220 via configuration connection 226 as described above. Network interface 230 is also configured to receive discrete signals, such as a reset signal or a disable signal, from processing system 208 using discrete transmission connection 216. Network interface is also configured to receive the packetized data from network function device 220 via ethernet connection 222.

Network interface 230 is also configured to send discrete information within secure network interface system 200. Network interface 230 is configured to transmit discrete feedback to network function device 220 via discrete return connection 228. The discrete feedback transmitted via discrete return connection 228 can indicate that network interface 230 was configured correctly or incorrectly. Additionally, network interface 230 can send packets of data relating to basic internet protocols to network function device 220 via ethernet connection 222. In some embodiments, network interface 230 is configured such that the only protocol types which can be transmitted from network interface 230 to network function device 220 are ARP and ICMP protocols. In other embodiments, other protocol types related to basic internet protocol functionality such as mapping internet protocol (IP) addresses, error reporting due to errors in transmitting or receiving data, or echo requests to test connectivity.

Network interface 230 is also configured to send data to external unsecure system 234 via ethernet connection 236. The outgoing data from network interface 230 to external unsecure system 234 can be any data received from network function device 220. In an example embodiment, network interface 230 can transmit video, audio, and/or text data as UDP data packets, wherein the UDP data packets were created by processing system 208. Further, network interface 230 can send ARP and/or ICMP packets to send and receive information regarding internet protocol functionality.

Network interface 230 can also filter the data received from external unsecure system 234. In some embodiments, network interface 230 is configured to limit the types of data packets received from external unsecure system 234. The types of data packets may be limited to ARP and/or ICMP packets. Additionally, network interface 230 may be configured to limit the rate at which external unsecure system 234 can transmit data back to network interface 230.

Network environment 200 provides a system for secure communication with external unsecure devices. The embodiment described uses a dedicated hardware device (network function device 220) to perform network services between a processing system and a standard ethernet network interface. Network function device 220 provides a limitation on the physical return path, as depicted in discrete return signal connection 210. Thus, if network function device 220 were to be compromised with unwanted or unsecure data, there would be no physical path for such data to reach components within secure network domain 202. Further, network environment 200 can be used with common off-the-shelf ethernet network interfaces as network interface 230, and is compliant with basic internet protocol functionality such as ARP and ICMP.

Figure 3:
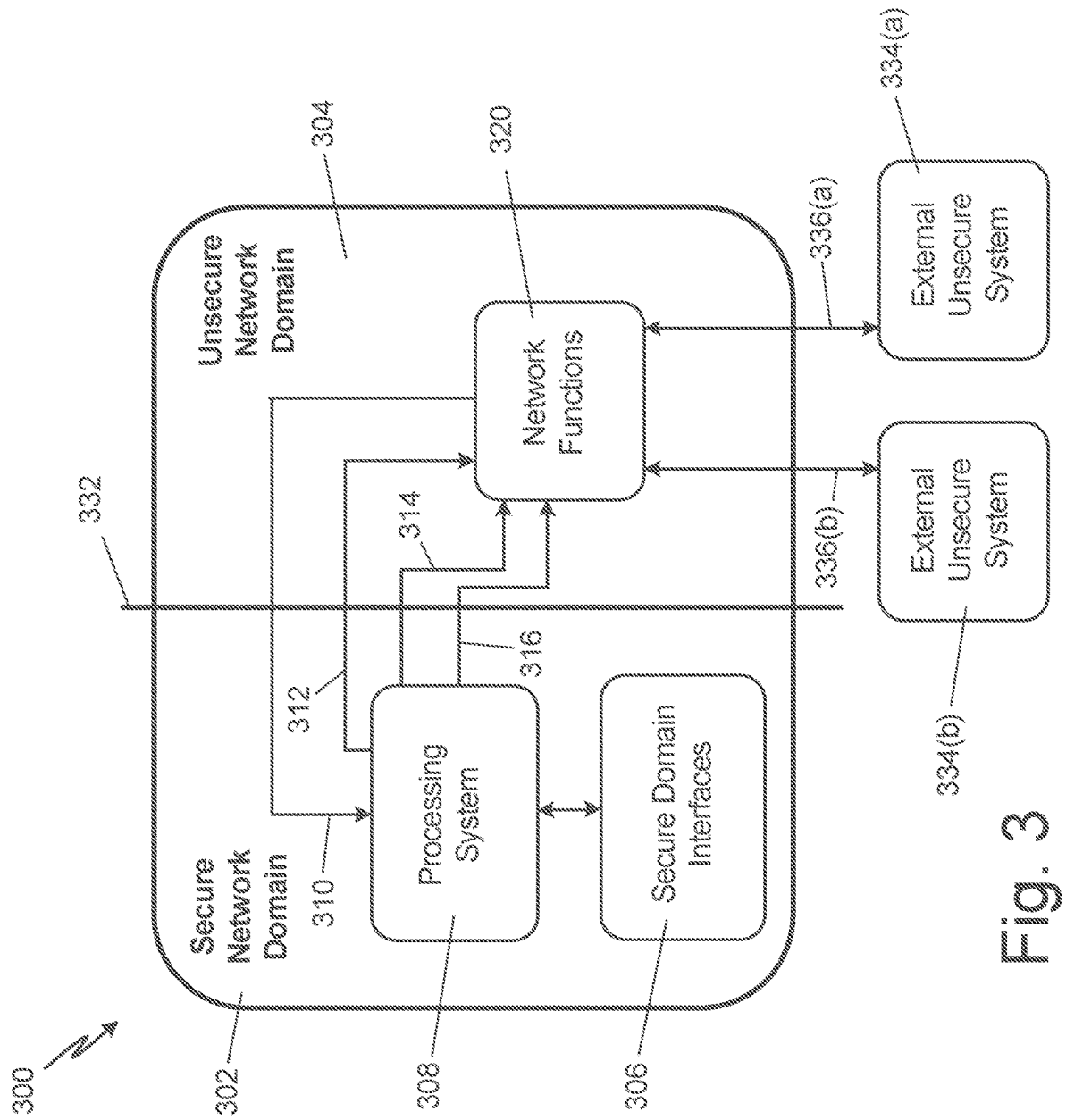
FIG. 3 is a diagram of an alternative embodiment of the network environment depicted in FIG. 2.

FIG. 3 is a diagram of an alternative embodiment of network environment 300. Secure network interface system includes secure domain network 302 and unsecure network domain 304. Network environment 300 also involves external unsecure systems 332(a) and 332(b) and ethernet connection 336(a) and 336(b) as depicted in FIG. 3.

Secure network domain 302 includes secure domain interfaces 306, processing system 308, discrete return connection 310, field-loading connection 312, ethernet connection 314, and discrete transmission connection 316. Unsecure network domain 304 includes network function device 320. Secure threshold 332 delineates the separation between secure network domain 302 and unsecure network domain 304. External unsecure systems 334(a) and 334(b) and ethernet connections 336(a) and 336(b) are external to network environment 300.

The depicted embodiment of secure network interface system 300 differs from secure network interface system 200. Network environment 300 does not include a network interface such as network interface 230 of FIG. 2. Further, network environment 300 includes connections to multiple external unsecure systems 334(a) and 334(b). In other embodiments, network environment 300 may connect to one, two, or more than two external unsecure systems.

Within secure network domain 302, secure domain interfaces 306 are operably connected to processing system 308. Processing system 308 is configured to send data across secure threshold 332 to network function device 320. Processing system 308 is operably connected to network function device 320 via discrete return connection 310, field-loading connection 312, ethernet connection 314, and discrete transmission connection 316. Network function device 320 is operably connected to external unsecure system 334(a) and 334(b) via ethernet connection 336(a) and 336(b) respectively.

In operation, secure domain interfaces 306 provide a means for processing system 308 to send and receive information freely with other systems residing within secure network domain 302 as described in FIG. 2. Processing system 308 is configured to send firmware to network function device 320 using field-loading connection 312. Field-loading connection 312 can be a unidirectional interface configured to send firmware and configuration data, without receiving return data from network function device 320 or any external system. The firmware may contain configuration instructions for the network function device 320. In some embodiments, the network function device is a Field Programmable Gate Array (FPGA). In such an embodiment, the FPGA is programmed by the firmware received from processing system 308 via field-loading connection 312.

Processing system 308 is further configured to be able to pass discrete signals from processing system 308 to network function device 320 via discrete transmission connection 316. The discrete signals sent from processing system 308 to network function device 320 can accomplish functions such as resetting network function device 320 or disabling network function device 320.

Processing system 308 may also receive discrete information back from network function device 320. This information can be indicative of a device status. In an example embodiment, network function device 320 may return a discrete signal of bits signaling that network function device 320 is functioning correctly, that network function device 320 is undergoing a reset, and/or that network function device 320 is disabled. Processing system 208 may receive such information via discrete return connection 310.

Discrete signals received along discrete return connection are limited to pre-defined logic signals. Thus, a returned signal along discrete return connection 310 can be limited to logic 0's and logic 1's, wherein the signal is indicative of a pre-defined function. Information that may be conveyed based on pre-defined functions includes but is not limited to a network function device 320 configuration status and a connectivity status between network function device 320 and external unsecure system 334(*a*) and 334(*b*). For example, processing system 308 may receive a return signal along discrete return connection 310 indicating that network function device 320 is configured correctly, and that connectivity with external unsecure systems 334(*a*) and 334(*b*) has been established with network function device 320. Such a signal would be indicated by a pre-defined string of discrete logic 0's and logic 1's. Thus, processing system 308 can be configured to only receive signals that coincide with the pre-defined functions.

Processing system 308 can also aggregate data to be shared with external unsecure systems 334(*a*) and 334(*b*). In some embodiments, processing system 308 aggregates and packetizes the data to be shared, and transmits the data to network function device 320 via ethernet connection 214. Network function device 220 transmits the packetized data to external unsecure systems 334(*a*) and 334(*b*) via ethernet connections 336(*a*) and 336(*b*). Data that is to be sent from processing system 308 to network function device 320 via ethernet connection 314 may be packetized in User Datagram Protocol (UDP) packets. UDP packets may contain data including but not limited to video, audio, and/or text data that is aggregated within secure network domain 302. The UDP packets from processing system 308 can be passed via a unidirectional MAC-to-MAC connection to network function device 320. In some embodiments, there may be no physical return path on the MAC-to-MAC connection from the network function device 320 to processing system 308 of the secure system. Other communication protocols for transmission of data such as video, audio, and/or text may also be used in a similar configuration.

Network function device 320 is configured to receive a bitstream from processing system 308 via field-loading connection 312. As described, the bitstream received from processing system 308 can contain firmware to be downloaded within network function device 220. Network function device 320 executes field-upgradable operational firmware to configure network function device 320 to the external unsecure systems 334(*a*) and 334(*b*), to handle the basic internet protocol messaging, and to provide only discrete pre-defined status signals back into processing system 308. The discrete feedback transmitted via discrete return connection 310 can indicate that network function device 320 was configured correctly or incorrectly by the bitstream sent by processing system 308.

Network function device 320 is further configured to receive the packetized data from processing system 308 and to send data to external unsecure systems 334(*a*) and 334(*b*) via ethernet connections 336(*a*) and 336(*b*). The outgoing data from network function device 320 to external unsecure systems 334(*a*) and 334(*b*) can be any data received from processing system 308. In an example embodiment, network function device 320 can transmit video, audio, and/or text data as UDP data packets, network function device 320 can send ARP and/or ICMP packets to send and receive information regarding internet protocol functionality.

Network function device 320 can also filter the data received from external unsecure systems 334(*a*) and 334(*b*). In some embodiments, network function device 320 is configured, by the firmware, to limit the types of data packets received from external unsecure systems 334(*a*) and 334(*b*). The types of data packets may be limited to ARP and/or ICMP packets. Additionally, network function device 320 may be configured to limit the rate at which external unsecure systems 334(*a*) and 334(*b*) can return information.

Network environment 300 provides generally the same advantages disclosed above in FIG. 2. In addition, the embodiment disclosed of network environment 300 mitigates the need for a network interface component by assigning the functions of the network interface to the dedicated hardware device (network function device 320), such as an FPGA. Further, network environment 300 depicts a connection to multiple external unsecure systems such as external unsecure systems 334(*a*) and 334(*b*), demonstrating that network environment 300 can maintain secure communication across multiple unsecure systems.

Figure 4:
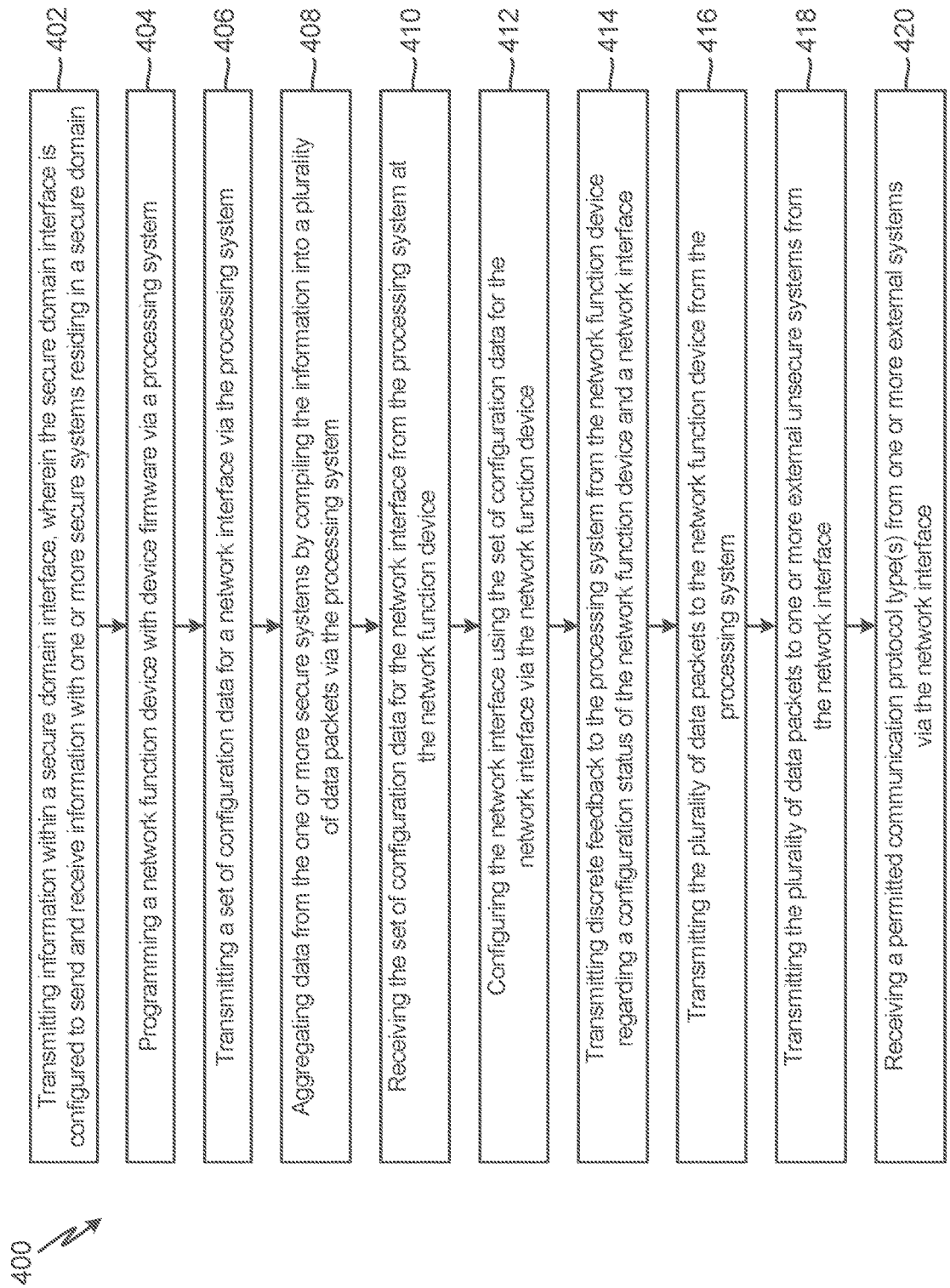
FIG. 4 is a method flowchart detailing an example process of secure information exchange between secure network interface system and the unsecure network.

FIG. 4 is a method flowchart of secure network process 400 detailing an example process of information exchange with respect to secure network domain 302, unsecure network domain 204, and external unsecure system 234. For the purposes of illustration, representative part numbers from secure network interface system 200 of FIG. 2 will be included in the description of secure network process 400. Secure network process 400, however, is not limited to the embodiment of FIG. 2 and may be implemented in other embodiments such as that of FIG. 3 or beyond.

Secure network process 400 begins at step 402 which includes transmitting information within secure domain interface 206, wherein the secure domain interface 206 is configured to send and receive information with one or more secure systems residing in secure network domain 202. At step 404, processing system 208 programs network function device 220 with device firmware. At step 406, processing system 208 transmits a set of configuration data for network interface 230. At step 408, processing system 208 aggregates data from the one or more secure systems by compiling the information into a plurality of data packets. At step 410, network function device 220 receives the set of configuration data for network interface 230 from processing system 208. At step 412, network function device 220 configures network interface 230 using the set of configuration data. At step 414, network function device 220 transmits discrete feedback to processing system 208 regarding a configuration status of network function device 220 and network interface 230. At step 416, processing system 208 transmits the plurality of data packets to network function device 220. At step 418, network interface 230 transmits the plurality of data packets to one or more external unsecure systems such as external unsecure system 234. At step 420, network interface 430 receives only permitted communication protocol types from the one or more external unsecure systems such as external unsecure system 234.

Based on the techniques described herein, network environment can be configured to preserve the security of a secure network domain. The network environment does so by sending data through a dedicated hardware network function device. The network function device can then perform basic internet protocol communication with external unsecure system, with or without a network interface, to accomplish tasks such as address resolution and ensuring connectivity. The secure network domain can be configured to only receive discrete pre-defined status data from the network function device. Such a configuration limits any unsecure or unwanted data from being returned to the secure network domain. Thus, the configurations disclosed in this description allow for delivery of data from a secure system to an external unsecure system as well as maintaining basic internet protocol, without providing an avenue for the security of the secure system to be breached.

Discussion of Possible Embodiments

The following are non-exclusive descriptions of possible embodiments of the present invention.

A secure network interface system includes a secure network domain and an unsecure network domain. The secure network domain includes one or more secure systems, a secure domain interface, and a processing system operably connected to the secure domain interface. The unsecure network domain includes a network function device operably connected to the processing system, and a network interface operably connected to the network function device. The processing system is configured to send and receive information with one or more secure systems residing in a secure domain through the secure domain interface, to program the network function device with a device firmware, to transmit a set of configuration data for the network interface, to aggregate data from the one or more secure systems by compiling the information into a plurality of data packets, and to transmit the plurality of data packets to the network function device. The network function device is configured to receive the set of configuration data for the network interface from the processing system, to configure the network interface using the set of configuration data for the network interface, and to provide discrete feedback to the processing system regarding a configuration status of the network function device and the network interface. The network interface is configured to send the plurality of data packets to one or more external unsecure systems and to receive one or more permitted communication protocol types from one or more external unsecure systems.

The system of the preceding paragraph can optionally include, additionally and/or alternatively, any one or more of the following features, configurations and/or additional components:

A further embodiment of the foregoing system, wherein the plurality of data packets are transmitted by the processing system to the network functioning device using a User Datagram Protocol communication protocol.

A further embodiment of any of the foregoing systems, wherein the communication protocol type received from the one or more external unsecure systems comprises Address Resolution Protocol.

A further embodiment of any of the foregoing systems, wherein the communication protocol type received from the one or more external unsecure systems further comprises Internet Control Message Protocol.

A further embodiment of any of the foregoing systems, wherein the network function device is a Field Programmable Gate Array.

A further embodiment of any of the foregoing systems, wherein the network interface is further configured to send one or more external system internet protocol messages to the one or more external unsecure systems.

A further embodiment of any of the foregoing systems, wherein the one or more external system internet protocol messages are sent via Address Resolution Protocol or Internet Control Message Protocol.

A further embodiment of any of the foregoing systems, wherein the network function device is further configured to provide discrete feedback to the processing system indicative of whether the device firmware was correctly programmed.

A further embodiment of any of the foregoing systems, wherein the processing system is further configured to be able to send a reset signal to the network function device or the network interface.

A secure network interface system includes a secure network domain and an unsecure network domain. The secure network domain includes one or more secure systems, a secure domain interface, and a processing system operably connected to the secure domain interface. The unsecure network domain includes a network function device operably connected to the processing system. The processing system is configured to send and receive information with one or more secure systems residing in a secure domain through the secure domain interface, to program a network function device with a device firmware, and to aggregate data from the one or more secure systems by compiling the information into a plurality of data packets. The network function device is configured to provide discrete feedback to the processing system regarding a configuration status of the network function device, to send the plurality of data packets to one or more external unsecure systems, and to receive one or more permitted communication protocol types from one or more external unsecure systems.

A method for secure network communication via a system having a secure domain interface, a processing system, a network function device, and a network interface includes transmitting information from the processing system to one or more secure systems residing in a secure domain through the secure domain interface. The method further includes aggregating data from the one or more secure systems by compiling the information into a plurality of data packets via the processing system and transmitting the plurality of data packets to the network function device from the processing system. The method further includes transmitting a set of configuration data for the network interface from the processing system to the network function device and configuring the network interface using the set of configuration data for the network interface via the network function device. The method further includes transmitting discrete feedback to the processing system from the network function device regarding a configuration status of the network interface, transmitting the plurality of data packets to one or more external unsecure systems from the network interface, and receiving one or more permitted communication protocol types from the one or more external unsecure systems via the network interface.

A further embodiment of the foregoing method, wherein the plurality of data packets are transmitted by the processing system to the network functioning device using a User Datagram Protocol communication protocol.

A further embodiment of any of the foregoing methods, wherein the communication protocol type received from the one or more external unsecure systems comprises Address Resolution Protocol.

A further embodiment of any of the foregoing methods, wherein the communication protocol type received from the one or more external unsecure systems further comprises Internet Control Message Protocol.

A further embodiment of any of the foregoing methods, wherein the network function device is a Field Programmable Gate Array.

A further embodiment of any of the foregoing methods, wherein the network interface is further configured to send one or more external system internet protocol messages to the one or more external unsecure systems.

A further embodiment of any of the foregoing methods, wherein the one or more external system internet protocol messages are sent via Address Resolution Protocol or Internet Control Message Protocol.

A further embodiment of any of the foregoing methods, wherein the network function device is further configured to provide discrete feedback to the processing system indicative of whether the device firmware was correctly programmed.

A further embodiment of any of the foregoing methods, wherein the processing system is further configured to be able to send a reset signal to the network function device or the network interface.

A further embodiment of any of the foregoing methods, wherein the processing system is further configured to be able to send a disable signal to the network function device or the network interface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A secure network interface system, comprising:
a secure network domain, comprising:
one or more secure systems;
a secure domain interface; and
a processing system, operably connected to the secure domain interface;
an unsecure network domain, comprising:
a network function device, operably connected to the processing system; and
a network interface, operably connected to the network function device;
wherein the processing system is configured to:
send and receive information with the one or more secure systems residing in the secure network domain through the secure domain interface;
program the network function device with a device firmware;
transmit a set of configuration data for the network interface;
aggregate data from the one or more secure systems by compiling the information into a plurality of data packets; and
transmit the plurality of data packets to the network function device;
wherein the network function device is a dedicated hardware device configured to:
receive the set of configuration data for the network interface from the processing system;
configure the network interface using the set of configuration data for the network interface; and
provide discrete feedback to the processing system regarding a configuration status of the network function device and the network interface, wherein the only discrete feedback able to be transferred from one or more external unsecure systems to the processing system within the secure network domain are one or more logic signals transferred through the network function device that are pre-defined by the secure network domain;
wherein the network interface is configured to:
send the plurality of data packets to one or more external unsecure systems; and
receive one or more permitted communication protocol types from one or more external unsecure systems.

2. The secure network interface system of claim 1, wherein the plurality of data packets are transmitted by the processing system to the network function device using a User Datagram Protocol communication protocol.

3. The secure network interface system of claim 1, wherein the one or more permitted communication protocol types comprises Address Resolution Protocol.

4. The secure network interface system of claim 3, wherein the one or more permitted communication protocol types further comprises Internet Control Message Protocol.

5. The secure network interface system of claim 1, wherein the network function device is a Field Programmable Gate Array.

6. The secure network interface system of claim 1, wherein the network interface is further configured to send one or more external system internet protocol messages to the one or more external unsecure systems.

7. The secure network interface system of claim 6, wherein the one or more external system internet protocol messages are sent via Address Resolution Protocol or Internet Control Message Protocol.

8. The secure network interface system of claim 1, wherein the discrete feedback is one or more pre-defined logic signals comprising a fixed number of binary digits.

9. The secure network interface system of claim 8, wherein the discrete feedback is indicative of whether the device firmware of the network function device is configured correctly.

10. A secure network interface system, comprising:
a secure network domain, comprising:
one or more secure systems;
a secure domain interface; and
a processing system, operably connected to the secure domain interface;
an unsecure network domain, comprising:
a network function device, operably connected to the processing system;
wherein the processing system is configured to:
send and receive information with the one or more secure systems residing in a secure domain through the secure domain interface;
program a network function device with a device firmware; and
aggregate data from the one or more secure systems by compiling the information into a plurality of data packets;
wherein the network function device is a dedicated hardware device configured to:
provide discrete feedback to the processing system regarding a configuration status of the network function device, wherein the only discrete feedback able to be transferred from one or more external unsecure systems to the processing system within the secure network domain are one or more logic signals transferred through the network function device that are pre-defined by the secure network domain;
send the plurality of data packets to one or more external unsecure systems; and limit a communication protocol type received from one or more external unsecure systems.

11. A method for secure network communication via a system including a secure domain interface, a processing system, a network function device, and a network interface, the method comprising:
- transmitting information from the processing system to one or more secure systems residing in a secure domain through the secure domain interface;
- aggregating data from the one or more secure systems by compiling the information into a plurality of data packets via the processing system;
- transmitting the plurality of data packets to the network function device, a dedicated hardware device, from the processing system;
- transmitting a set of configuration data for the network interface from the processing system to the network function device;
- configuring the network interface using the set of configuration data for the network interface via the network function device;
- transmitting discrete feedback to the processing system from the network function device regarding a configuration status of the network interface, wherein the only discrete feedback able to be transferred from one or more external unsecure systems to the processing system within the secure network domain are one or more logic signals transferred through the network function device that are pre-defined by the secure network domain;
- transmitting the plurality of data packets to one or more external unsecure systems from the network interface; and
- receiving one or more permitted communication protocol types from the one or more external unsecure systems via the network interface.

12. The method of claim 11, the method further comprising transmitting the plurality of data packets from the processing system to the network functioning device using a User Datagram Protocol communication protocol.

13. The method of claim 11, wherein the one or more permitted communication protocol types comprises Address Resolution Protocol.

14. The method of claim 13, wherein the one or more permitted communication protocol types further comprises Internet Control Message Protocol.

15. The method of claim 11, wherein the network function device is a Field Programmable Gate Array.

16. The method of claim 11, wherein the network interface is further configured to send one or more external system internet protocol messages to the one or more external unsecure systems.

17. The method of claim 16, wherein the one or more external system internet protocol messages are sent via Address Resolution Protocol or Internet Control Message Protocol.

18. The method of claim 11, wherein the discrete feedback is one or more pre-defined logic signals comprising a fixed number of binary digits.

19. The method of claim 18, wherein the discrete feedback is indicative of whether the device firmware of the network function device was configured correctly.

20. The method of claim 11, wherein the processing system is further configured to be able to send a reset signal to the network function device or the network interface.

* * * * *